March 5, 1929.

H. S. JANDUS ET AL

CLAMP PLATE

Re. 17,226

Original Filed Dec. 23, 1927

INVENTOR.
Herbert S. Jandus
Norman Van Huesen

BY
Hall, Brock and West
ATTORNEY.

Reissued Mar. 5, 1929.

Re. 17,226

UNITED STATES PATENT OFFICE.

HERBERT S. JANDUS AND NORMAN VAN HUSEN, OF DETROIT, MICHIGAN, ASSIGNORS TO THE C. G. SPRING & BUMPER COMPANY, OF DETROIT, MICHIGAN, A CORPORATION OF DELAWARE.

DESIGN FOR A CLAMP PLATE.

Original No. 76,800, dated November 6, 1928, Serial No. 24,616, filed December 23, 1927, for 3½ years. Application for reissue filed December 20, 1928. Serial No. 29,342. Term of patent 14 years.

*To all whom it may concern:*

Be it known that we, HERBERT S. JANDUS and NORMAN VAN HUSEN, citizens of the United States, residing at Detroit, in the county of Wayne and State of Michigan, have invented a new, original, and ornamental Design for a Clamp Plate, of which the following is a specification, reference being had to the accompanying drawing, forming part hereof, wherein—

Figure 1:
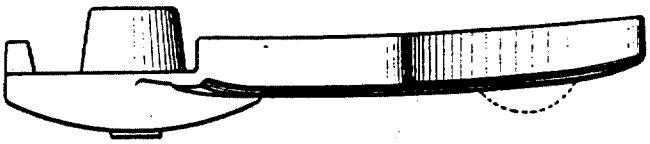
Figure 2:
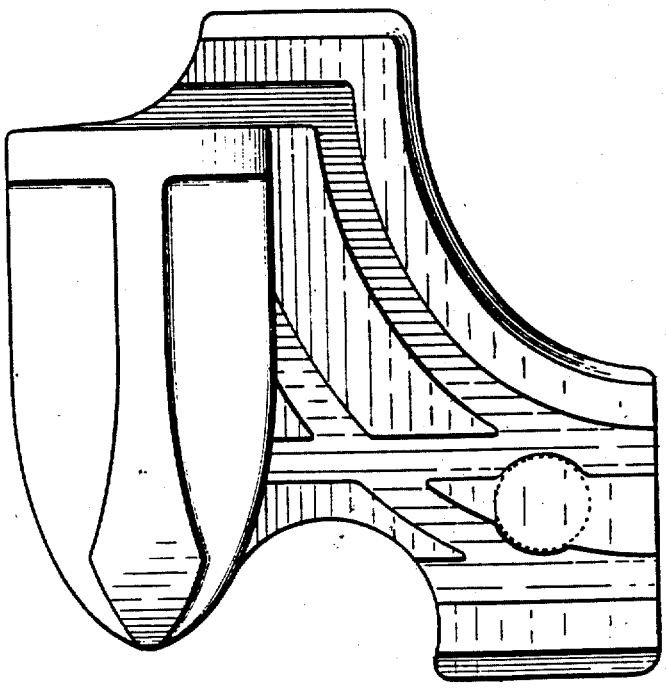

Fig. 1 represents a plan view and Fig. 2 represents a front elevation of a clamp plate exhibiting our new design, a bolt head being shown in dotted line.

We claim:—

The ornamental design for a clamp plate substantially as shown and described.

In testimony whereof we hereunto affix our signatures.

HERBERT S. JANDUS.
NORMAN VAN HUSEN.